Patented Feb. 15, 1944

2,341,610

UNITED STATES PATENT OFFICE 2,341,610

PROCESS FOR THE MANUFACTURING OF DEXTRO-PANTOTHENIC ACID

André Grüssner, Basel, Switzerland, assignor to Hoffmann-La Roche, Inc., Nutley, N. J., a corporation of New Jersey No Drawing. Application September 16, 1941, Serial No. 411,077. In Switzerland September 19, 1940

1 Claim. (Cl. 260—534)

The resolution of pantothenic acid into the optically pure antipodes by fractionated crystallisation of the quinine salts has already been tried (Berichte der Deutschen Chemischen Gesellschaft, vol. 73, year 1940, page 971). From the physical constants cited in the said publication it follows that the separation of the quinine salts of dextro- and levo-pantothenic acid did not succeed. Whereas the melting point of levo-quinine pantothenate is stated to be 165–167° C., it is in fact 183° C. The specific rotation of this quinine salt is —121° and not —115°. The melting point of the quinine salt of dextro-pantothenic acid is not 148–152° C., as stated in the above-mentioned publication, but 136–137° C.

It has now been found that the resolution of the racemic pantothenic acid by way of the quinine salts can be effected first by recrystallisation of the quinine salt of the racemic pantothenic acid from ethyl alcohol. Thereby, the quinine salt of levo-pantothenic acid separates in small felted needles of melting point 183° C. A further crystallisation of this salt is rendered possible by concentration and cooling of the mother liquor to 0° C. After separation of the greater part of the levo-quinine pantothenate, the mother liquor contains the quinine salt of the dextro-form in high concentration so that it crystallises out as colorless needles of melting point 136–137° C. after evaporation of the alcohol and recrystallisation from acetone. The acetone mother liquor again contains a mixture of the dextro- and levo-form. Once more pure dextro-quinine pantothenate can be obtained therefrom if the acetone is evaporated and the residue recrystallised from alcohol. Thereby, pure levo-quinine pantothenate again separates. In the alcoholic mother liquor the dextro-form predominates. The mother liquor is evaporated and the residue treated with acetone. Further quantities of dextro-quinine pantothenate are obtained from the acetone solution. For the preparation of dextro-pantothenic acid from dextro-quinine pantothenate the usual method is employed.

Example 54.5 parts by weight of d,l-barium pantothenate are dissolved in 150 parts by volume of alcohol while heating. This solution is treated with a hot solution of about 77 parts by weight of quinine sulfate in 200 parts by volume of alcohol. The clear solution freed from barium sulfate by centrifuging contains neither barium nor sulfuric acid; it is evaporated to 200 parts by volume and then left to stand. The precipitated crystals are sucked off after some time. About 18 parts by weight of the quinine salt of levo-pantothenic acid are obtained having a melting point of 183° C. and a specific rotation of $[\alpha]_D^{18°} = -121°$ (c=1.342 in water). By concentration of the mother liquor and leaving it to stand at 0° C. further quantities of levo-quinine pantothenate are separated. Altogether about 47 parts by weight of this salt are obtained.

The mother liquors are then evaporated to dryness and the residue dissolved in about 100 parts by volume of acetone whereupon the quinine salt of dextro-pantothenic acid separates after a while in colorless needles having a melting point of 135–137° C. and a specific rotation of $$[\alpha]_D^{19°} = -95°$$

(c=0.937 in water). The yield amounts to about 31 parts by weight. By repeating the process further quantities are obtained from the mother liquor.

The dextro-quinine pantothenate is dissolved in water and rendered alkaline to phenolphthalein by means of bryta water. The precipitated quinine is removed by shaking with chloroform and ether and the barium precipitated with sulfuric acid. After the separation of the barium sulfate, dextro-pantothenic acid is obtained as a syrup by evaporation in vacuo.

I claim:

A process for the manufacture of dextro-pantothenic acid which comprises recrystallizing the quinine salt of racemic pantothenic acid from ethyl alcohol, separating the crystallized quinine salt of levo-pantothenic acid, evaporating the mother liquor, recovering the quinine salt of dextro-pantothenic acid from the residue by crystallization from acetone, and converting the quinine salt of dextro-pantothenic acid into dextro-pantothenic acid.

ANDRÉ GRÜSSNER.